No. 618,691. Patented Jan. 31, 1899.
C. A. LA GRAVE.
BICYCLE DRIVING GEAR.
(Application filed Dec. 21, 1897.)
(No Model.) 2 Sheets—Sheet 1.
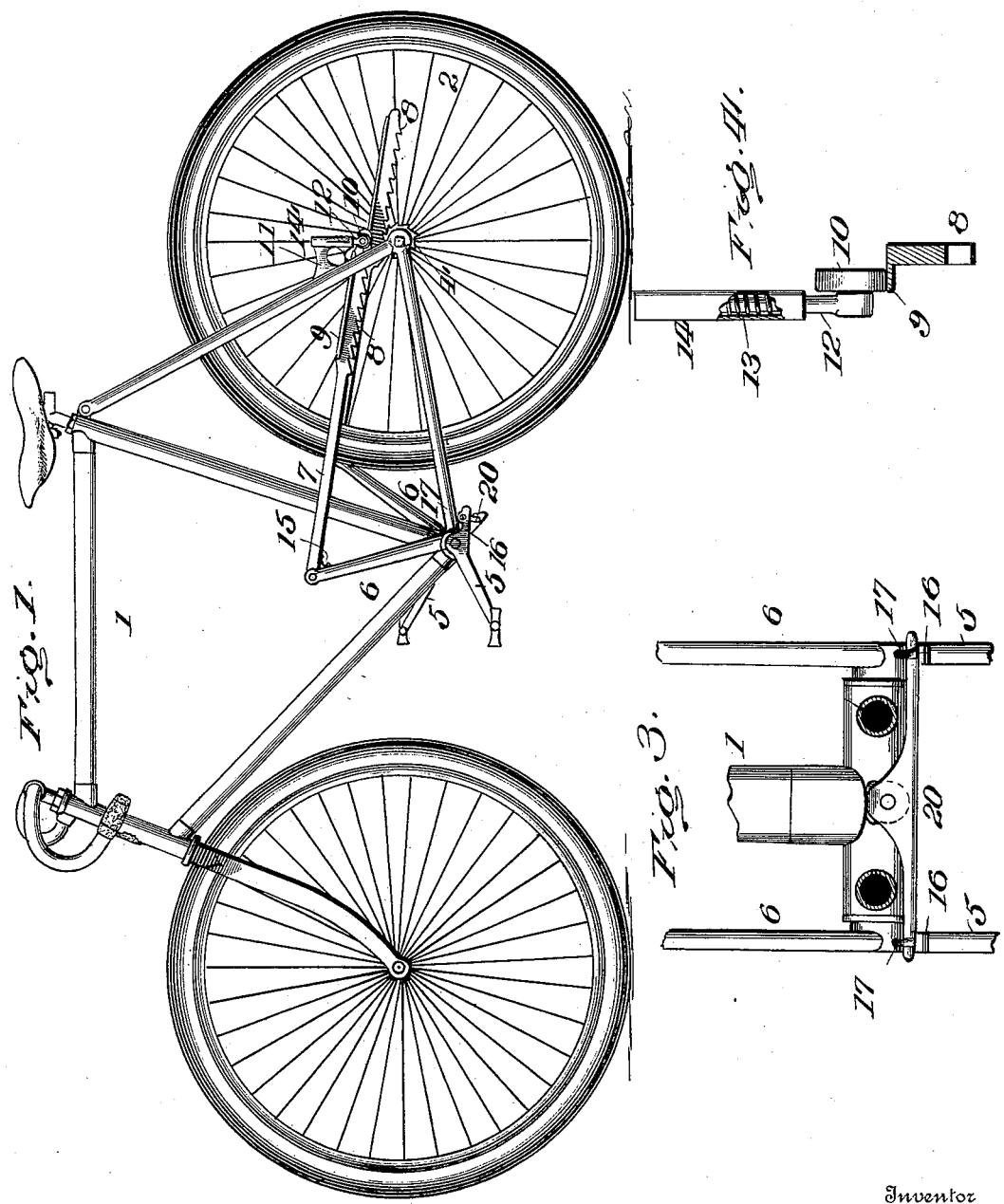

No. 618,691. Patented Jan. 31, 1899.
C. A. LA GRAVE.
BICYCLE DRIVING GEAR.
(Application filed Dec. 21, 1897.)
(No Model.) 2 Sheets—Sheet 2.
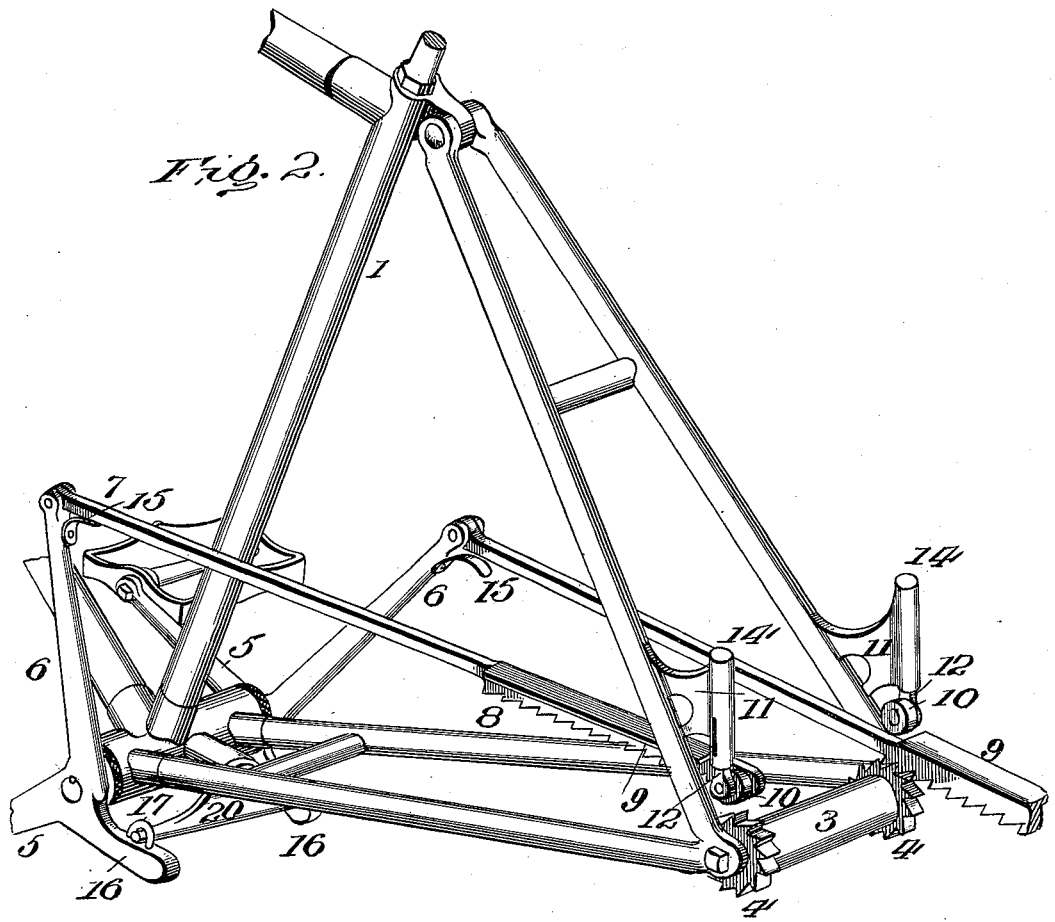
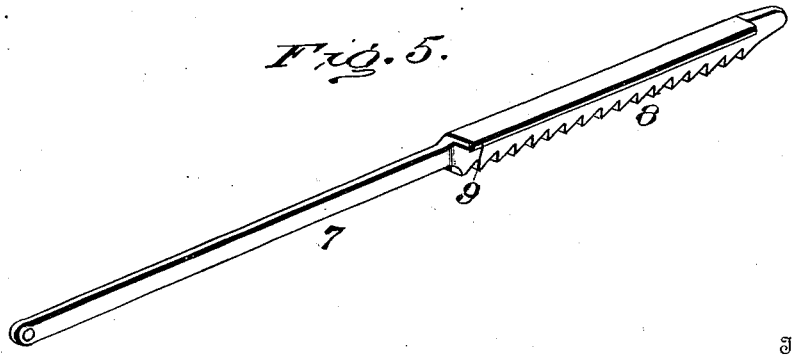

UNITED STATES PATENT OFFICE.

CHARLES A. LA GRAVE, OF CARSON, NEVADA.

BICYCLE DRIVING-GEAR.

SPECIFICATION forming part of Letters Patent No. 618,691, dated January 31, 1899.

Application filed December 21, 1897. Serial No. 662,848. (No model.)

*To all whom it may concern:*

Be it known that I, CHARLES A. LA GRAVE, residing at Carson city, in the county of Ormsby and State of Nevada, have invented certain new and useful Improvements in Bicycle Driving-Gear, of which the following is a specification, reference being had therein to the accompanying drawings.

This invention relates to driving-gear for bicycles.

The object of the invention is to produce a direct-acting gear by which the pedal power may be conveyed to the drive-wheel without a crank and in which the depression of one pedal shall serve to raise the other; also, to improve bicycle driving-gear in various particulars.

Figure 1 is a side elevation of a bicycle with the improved driving-gear. Fig. 2 is a perspective detail of the driving-gear and part of the frame and the wheel-hub, parts being broken away. Fig. 3 is a broken cross-section showing lever connecting pedal-levers. Fig. 4 is a detail of the rack-guide, showing rack in section. Fig. 5 is a perspective of one of the rack-bars.

The bicycle may be of any approved construction. The frame 1, as shown, is in general well known. The drive-wheel 2 has a hub 3 with two ratchet-wheels 4 4, one of these ratchets at each side of the hub. The pedals and connections are similar, each pedal being on a crank-lever 5, which lever is pivoted at the side of the frame. The arm 6 of the lever 5 has a rack-bar 7, pivotally connected thereto. This rack-bar 7 has a rack 8, extending back into position for engagement with ratchet-wheel 4, all these parts being duplicated on the opposite sides of the machine. The rack-bar 8 has a side flange 9, which side rides either above or below a pulley or support 10, as will be explained. Pulley 10 is supported from bracket 11 on the frame, preferably by a spring-actuated spindle 12, to which the pulley is pivoted, the pulley being thus allowed to yield slightly either up or down and the spring 13 being protected by a socket or casing 14 on the bracket 11. The flange 9 is not quite as long as the full stroke of the rack-bar when actuated by a full movement of the pedal-lever. The flange 9 projects under the pulley 10 when the rack is about to make its forward stroke, as at the right-hand rack-bar in Fig. 2. In such position the lever 6 is at its lowest position, and there being nothing to support the rack-bar above the ratchet-wheel the rack falls into engagement with the ratchet-wheel by gravity.

A curved spring or lifting-piece 15, attached to lever 6 near the pivot of the rack-bar, comes into engagement with the rack-bar as the lever 6 swings upward and forward. This spring then tends to raise the ratchet-teeth out of engagement with the ratchet 4; but the rack-bar is prevented from rising as long as flange 9 lies under roll 10; but when flange 9 has been drawn beyond pulley or roll 10, as at the left of Fig. 2, the spring 15 will immediately raise the rack-bar out of engagement with the ratchet 4 and in the backward movement of the rack-bar will be held up by the flange 9, riding on the pulley 10, so there will be no click of the ratchets and but little friction of parts. Thus it will be seen that the downward swing of the pedal on arm 5 of the crank-lever draws forward the rack-bar 7, thus turning the hub and drive-wheel by the rack-and-pawl connection, while in the backward movement the rack-bar will be free from the ratchet on the hub until it falls thereon as the flange 9 passes beyond its support 10 in the backward movement.

An arm 16 of each crank-arm 5 extends to the rear of the pivot and has a loop 17 attached. A rocking lever 20 is pivoted or fulcrumed on the frame or a support thereon and has its ends in the loops 17. The lever 20 is thus caused to swing on its fulcrum by the downward movement of a pedal and by such movement serves to lift the opposite pedal. The loose engagement of the lever 20 with the loops 17, connected to the crank-levers, permits this engagement to be made with but little loss by friction.

The roll or pulley 10 might be fixed without greatly interfering with the operation, but would of course increase friction. Other changes within the scope of the claims may be made without departing from the spirit of my invention.

What I claim is—

1. In a bicycle driving-gear, the pedal-lever having a rack-bar connected thereto, a spring connected to the lever and brought into contact with the rack-bar by the swing of the lever, and a support on the frame onto which the rack-bar is lifted by said spring during the return movement, substantially as described.

2. In a bicycle, a three-armed lever pivoted at each side of the frame, a pedal on one arm of each of said levers, a rack connected to a second arm and extending to a gear on the hub, means for disconnecting one of said racks while the other is in engagement, and a lever pivoted to the frame intermediate the pedal-levers and engaging the third arm of each lever, all combined substantially as described.

3. In a bicycle driving-gear, the pedals and rack-bars connected thereto by suitable mechanism so as to reciprocate alternately as the pedals are operated, ratchet-wheels on the wheel-hub with which the rack-bars engage as described, side flanges on the rack-bars, and pulleys yieldingly supported on the frame above the ratchets, on which pulleys the flanges of the rack-bars are supported while said bars are moving in one direction, and by which said bars are held down while moving in the other direction, the specified elements and their necessary coöperating adjunctive mechanical elements all combined substantially as described.

4. In a bicycle driving-gear, the pedals and pedal-levers suitably connected to reciprocate alternately, the rack-bars pivotally connected to the pedal-levers, an interposed lifting-piece for each lever and rack-bar, which piece is swung into engagement to lift the rack-bar only as the movement of that pedal-lever nears completion in one direction, the hub having ratchets with which the rack-bars engage, a yielding support engaging each rack-bar above the ratchet, and the necessary coöperative mechanism, all combined, substantially as described.

In testimony whereof I affix my signature in presence of two witnesses.

CHARLES A. LA GRAVE.

Witnesses:
 W. J. WESTERFIELD,
 W. R. DAVIS.